US011629518B2

(12) United States Patent
Malsch et al.

(10) Patent No.: US 11,629,518 B2
(45) Date of Patent: Apr. 18, 2023

(54) TUNED LIQUID DAMPER WITH A MEMBRANE LIQUID-GAS INTERFACE

(71) Applicant: Hummingbird Kinetics LLC, New York, NY (US)

(72) Inventors: Elisabeth Malsch, New York, NY (US); Marguerite Pinto, Elkins Park, PA (US); Pierre Ghisbain, New York, NY (US); Sebastian Mendes, New York, NY (US); Callum Norris, Fife (GB); Phillip Thompson, Fife (GB)

(73) Assignee: HUMMINGBIRD KINETICS LLC, New York, NY (US)

( * ) Notice: Subject to any disclaimer, the term of this patent is extended or adjusted under 35 U.S.C. 154(b) by 432 days.

(21) Appl. No.: 15/904,040

(22) Filed: Feb. 23, 2018

(65) Prior Publication Data

US 2018/0245337 A1    Aug. 30, 2018

Related U.S. Application Data

(60) Provisional application No. 62/464,639, filed on Feb. 28, 2017.

(51) Int. Cl.
*E04B 1/98* (2006.01)
*E04H 9/14* (2006.01)
(Continued)

(52) U.S. Cl.
CPC .............. *E04H 9/0215* (2020.05); *E04H 9/14* (2013.01); *E04H 9/16* (2013.01)

(58) Field of Classification Search
CPC ......... E04B 1/985; E04H 9/16; B60T 15/021; B60T 15/42; B60T 17/00; B60T 17/06;
(Continued)

(56) References Cited

U.S. PATENT DOCUMENTS 2,846,983 A * 8/1958 Otto ........................ F15B 15/10
267/122
3,121,479 A * 2/1964 Diilenburger ........... F16F 9/088
188/269
(Continued)

FOREIGN PATENT DOCUMENTS

CN    102138023 A    7/2011
CN    103669631 A    3/2014
(Continued)

OTHER PUBLICATIONS

English machined translation of JP-2011-231791, Nov. 17, 2011, 2011.*

(Continued)

*Primary Examiner* — Robert A. Siconolfi
*Assistant Examiner* — San M Aung
(74) *Attorney, Agent, or Firm* — ArentFox Schiff LLP

(57) ABSTRACT

A tuned liquid damper, including a first outer housing having two ends, the first end being open to the atmosphere and the second end being connected by a conduit to a gas-filled second outer housing. The conduit may be adapted to allow gas flow between the second end and the second outer housing. The tuned liquid damper may also include first and second membranes, each attached to the inside of the first outer housing, and a sealed compartment within the first outer housing defined by the first and second membranes. The sealed compartment may be at least partially filled with a liquid, which prevents gas flow through the first outer housing from the first end to the second end.

17 Claims, 11 Drawing Sheets

(51) Int. Cl.
*E04H 9/16* (2006.01)
*E04H 9/02* (2006.01)

(58) Field of Classification Search
CPC ....... B60T 17/004; B60N 2/501; B60N 2/505;
B60N 2/522; B60N 2/525; B60N 2/527;
B60G 15/12; B60G 15/062; B60G 17/08;
B60G 2600/22; B60G 2206/41; B60G
2800/162; B60G 2202/24; B60G 2500/10;
G12B 5/00; F16F 9/532; F16F 9/066;
F16F 9/069; F16F 9/535; F16F 9/53;
F16F 2228/066; F15B 15/10; F01B 19/04
USPC ..... 303/1; 267/64.23, 64.26; 188/267.1, 298
See application file for complete search history.

(56) References Cited

U.S. PATENT DOCUMENTS

| | | | |
|---|---|---|---|
| 3,131,856 A | | 5/1964 | Michener |
| 4,407,125 A | | 10/1983 | Parsons |
| 4,784,378 A | | 11/1988 | Ford |
| 4,856,733 A | | 8/1989 | Noguchi et al. |
| 4,858,733 A | * | 8/1989 | Noguchi ............... B60N 2/505 188/267.1 |
| 5,070,663 A | | 12/1991 | Sakai et al. |
| 5,775,637 A | | 7/1998 | Vuillet et al. |
| 8,151,953 B2 | * | 4/2012 | Runkel ............. B60G 17/0525 188/314 |
| 9,718,653 B2 | * | 8/2017 | Bergem ................. B66C 23/53 |
| 2005/0012255 A1 | | 1/2005 | Denk |
| 2010/0083653 A1 | | 4/2010 | Hawkins |
| 2010/0200348 A1 | | 8/2010 | Reiterer et al. |
| 2011/0083929 A1 | | 4/2011 | Marking |
| 2011/0115140 A1 | | 5/2011 | Moulik et al. |
| 2018/0024537 A1 | | 1/2018 | Chauvet et al. |
| 2018/0245337 A1 | | 8/2018 | Malsch et al. |
| 2019/0061884 A1 | | 2/2019 | Lepreux et al. |

FOREIGN PATENT DOCUMENTS

| | | | |
|---|---|---|---|
| CN | 103775555 A | | 5/2014 |
| CN | 204327834 U | | 5/2015 |
| CN | 205475804 U | | 8/2016 |
| CN | 106122341 A | | 11/2016 |
| CN | 205875444 U | | 1/2017 |
| DE | 29702927 U1 | | 5/1997 |
| JP | H02278033 A | | 11/1990 |
| JP | H08200436 A | | 8/1996 |
| JP | 2011-231791 A | | 11/2011 |
| JP | 2011231791 A | * | 11/2011 |

OTHER PUBLICATIONS

International Search Report issued for PCT/US2018/019988, dated Jul. 20, 2018.
Written Opinion of the International Searching Authority issued for PCT/US2018/019988, dated Jul. 20, 2018.
Invitation to Pay Additional Fees And, Where Applicable, Protest Fee Issued for PCT/US18/199988, date of mailing May 23, 2018.
Supplementary European Search Report issued for corresponding EP Application No. EP 18 76 0948 (2pps) and EP Search Opinion for corresponding EP Application No. EP 18 760 948.2 (4 pgs), dated May 19, 2020.
Chinese Search Report issued for corresponding CN Application No. 2018800144199, dated Aug. 21, 2020 (Chinese Office Action dated Aug. 21, 2020).
Taiwan Search Report issued for corresponding Taiwan Patent Application No. 107106671, search report dated Mar. 8, 2021.
Ghisbain, et al., Innovative Tuned Liquid Damper System, 19th IABSE Congress Stockholm, Challenges in Design and Construction of an Innovative and Sustainable Built Environment, Sep. 2016 (7 pages).
YouTube video entitled "Marshall Space Flight Center's Fluid Structure Coupling Technology," posted Jul. 28, 2015, [retrieved Feb. 11, 2020], Retrieved from Internet, <URL: https://www.youtube.com/watch?v=A1_k0YWILCg>.

* cited by examiner

Damper configuration with a gas spring at both ends of the liquid column

Gas spring at rest (left) and expanded (right)

Gas spring model

Test setup

Test setup parameters

Damper model properties

TUNED LIQUID DAMPER WITH A MEMBRANE LIQUID-GAS INTERFACE

CROSS-REFERENCE TO RELATED APPLICATION

This application claims the benefit of U.S. Provisional Application No. 62/464,639, filed on Feb. 28, 2017, the contents of which are hereby incorporated by reference in their entirety.

TECHNICAL FIELD

The present disclosure relates to a tuned liquid damper with at least one membrane liquid-gas interface ("TLDM"), which in select aspects, provides a damper device suitable to reduce wind-induced and other vibrations when affixed to tall buildings or structures, such as skyscrapers and towers.

BACKGROUND

Tall buildings often require supplemental damping to keep the wind-induced vibrations at a level imperceptible by most building occupants during wind storms. Damping devices have been developed which are able to mitigate structural vibration to varying extents. However, each of the general implementations currently known in the art is subject to limitations inherent to the structure and physical principles underlying these devices. For example, devices based upon a solid mass counterweight, such as tuned mass dampers ("TMDs") and active mass dampers ("AMDs"), are expensive and heavy (e.g., weighing hundreds of tons). These implementations operate, for example, by swinging or sliding a solid weight counter based on the sway of the building. However, a solid weight counter reduces the amount of leasable floor space in a building and typically requires extensive customization, thereby increasing costs. Alternative liquid-based damper systems are known in the art, such as traditional tuned liquid dampers ("TLDs"), which function as a "slosh tank" as the building sways thereby absorbing vibration energy. As with the solid mass dampers, traditional TLDs suffer from increased costs resulting from the custom-built nature of these devices and maintenance costs associated with maintaining a large tank of liquid and again the concomitant loss in leasable floor space.

The tuned liquid column damper ("TLCD") is an alternative liquid-based damper solution, which partially mitigates the drawbacks of traditional TLDs. A standard TLCD is a U-shaped tank filled with water and sized such that the water naturally oscillates in the tank at the same frequency as the wind-induced building motion. For example, during a wind storm, the water oscillating in the tank dissipates the wind energy transferred to the building. A limitation of the TLCD is that it is tuned to a particular frequency by design and cannot be tuned to a different frequency without a major retrofit of the finished damper. Furthermore, TLCDs typically require a large amount of horizontal space and so cannot fit in building with a small or narrow footprint, such as slim skyscrapers, which are becoming increasingly popular among urban developers. In addition, the motion of the water in the TLCD does not dissipate energy consistently when the amplitude of motion varies. Finally, the TLCD tank is typically made of concrete and may leak over time thereby increasing costs.

The shortcoming of standard TLCDs may be partially addressed by an alternative implementation, consisting of a U-shaped pipe filled with water similar to a standard TLCD, but capped at one end with a gas spring (the "spring TLCD"). The gas spring is an enclosed volume of gas in contact with one of the water surfaces. When the water surface rises, the gas is compressed and pushes the water back down. Conversely, when the water surface drops, the gas expands and pulls the water back up. The stiffness of the gas spring depends on the enclosed volume of gas, which can be adjusted with a moveable plug after the damper is installed. The gas spring allows the spring TLCD to be tuned to a broader range of frequencies than standard TLCDs. However, the spring TLCD remains subject to a substantial limitation in that the adjustable stiffness of the gas spring can only add to the gravity-induced stiffness of the U-shaped pipe. The total stiffness of the spring TLCD can therefore never be less than this gravity-induced stiffness, which is too high to tune the damper to the low frequencies of very tall buildings. As a result, the spring TLCD cannot be relied upon to efficiently dampen wind-induced vibrations in tall buildings (e.g., slender skyscrapers) above a height-to-width ratio of 10. Furthermore, the vertical ends required by a TLCD are obtrusive and reduce the number of viable placement locations within a structure. Given these shortcomings in the standard and spring TLCDs as well as other damper devices known in the art (e.g., solid mass, piston and bellows-based devices), there exists a need for an efficient vibration damper solution that is compatible with contemporary structures, particularly, thin skyscrapers which are becoming increasingly popular in modern architecture. In addition, there exists a need for dampers that are easily adjustable compared to systems currently known in the art, which are often difficult to modify after the initial installation.

BRIEF SUMMARY OF EXEMPLARY ASPECTS

The present disclosure provides various configurations of a TLDM with a membrane liquid-gas interface which reduces or eliminates the above-identified problems in the art. In addition, selected aspects of the disclosure provide other benefits and solutions as discussed in detail below.

In a first exemplary aspect, a TLDM according to the present disclosure comprises a first outer housing having two ends, the first end being open to the atmosphere and the second end being connected by a conduit to a gas-filled second outer housing, the conduit being adapted to allow gas flow between the second end and the second outer housing; first and second membranes, each attached to the inside of the first outer housing; and a sealed compartment within the first outer housing, defined by the first and second membranes and being at least partially filled with a liquid, which prevents gas flow through the first outer housing from the first end to the second end.

In select aspects of any of the exemplary aspects disclosed herein, the sealed compartment may be completely filled with the liquid.

In select aspects, the second outer housing contains a variable-position plug attached to an inside perimeter of the second outer housing, the plug being positioned to allow adjustment of the volume of gas stored in the second outer housing.

In select aspects, at least one of the first and second membranes is a variable-position membrane configured to allow repositioning of the attachment point along a longitudinal axis of the first outer housing.

In select aspects, the first and second membranes are flexible and adapted to allow displacement of the liquid-filled compartment along a longitudinal axis of the first outer housing.

In select aspects, the first and second outer housings are adapted to function as a gas spring in response to displacement of the liquid-filled compartment along a longitudinal axis of the first outer housing, the gas spring being adapted to control a frequency and a level of vibration damping provided by the damper.

In select aspects, the conduit is adapted to allow adjustment of at least one of a length or a width of the conduit.

In a second exemplary aspect, a TLDM according to the present disclosure comprises an outer housing having two ends, the first end being open to the atmosphere and the second end being a sealed, gas-filled chamber within the outer housing; a separator attached to an inner perimeter wall of the chamber, the separator defining first and second partitions within the chamber and having an opening which allows gas to flow between the first and second partitions; first and second membranes, each attached to the inside of the outer housing; and a sealed compartment within the outer housing, defined by the first and second membranes and being at least partially filled with a liquid, which prevents gas flow through the outer housing from the first end to the second end.

In select aspects, the separator is a variable-position separator adapted to allow repositioning of the separator along an axis of the chamber and adjustment of the volume of gas stored in each of the first and second partitions.

In select aspects, at least one of the first and second membranes is a variable-position membrane configured to allow repositioning of the attachment point along a longitudinal axis of the outer housing.

In select aspects, the first and second membranes are flexible and adapted to allow displacement of the liquid-filled compartment along a longitudinal axis of the outer housing.

In select aspects, the first and second partitions are adapted to function as a gas spring in response to displacement of the liquid-filled compartment along a longitudinal axis of the outer housing, the gas spring being adapted to control a frequency and a level of vibration damping provided by the damper.

In select aspects, the opening of the separator is adapted to allow adjustment of at least one of a length or a width of the opening.

In a third exemplary aspect, a TLDM according to the present disclosure comprises a first outer housing having: a first end connected by a conduit to a gas-filled second outer housing, the conduit being adapted to allow gas flow between the first end and the second outer housing; a second end connected by a conduit to a gas-filled third outer housing, the conduit being adapted to allow gas flow between the second end and the third outer housing; first and second membranes, each attached to the inside of the first outer housing; and a sealed compartment within the first outer housing, defined by the first and second membranes and being at least partially filled with a liquid, which prevents gas flow through the first outer housing from the first end to the second end.

In select aspects, at least one of the second or third outer housings contains a variable-position plug attached to an inner perimeter of the respective outer housing, the plug being adapted to allow adjustment of the volume of gas stored in the respective outer housing.

In select aspects, at least one of the first and second membranes is a variable-position membrane configured to allow repositioning of the attachment point along a longitudinal axis of the first outer housing.

In select aspects, the first and second membranes are flexible and adapted to allow displacement of the liquid-filled compartment along a longitudinal axis of the first outer housing.

In select aspects, (a) the first and second outer housings are adapted to function as a gas spring in response to displacement of the liquid-filled compartment along a longitudinal axis of the first outer housing, the gas spring being adapted to control a frequency and a level of vibration damping provided by the damper; and/or (b) the first and third outer housings are adapted to function as a gas spring in response to displacement of the liquid-filled compartment along a longitudinal axis of the first outer housing, the gas spring being adapted to control a frequency and a level of vibration damping provided by the damper.

In select aspects, at least one of the conduits connecting the housings is adapted to allow adjustment of at least one of a length or a width of the conduit.

In a fourth exemplary aspect, a TLDM according to the present disclosure comprises a first outer housing having a first end and a second end, each end being connected by a separate conduit to a gas-filled second outer housing, wherein the conduits are adapted to allow gas flow between the first outer housing and the second outer housing; first and second membranes, each attached to the inside of the first outer housing; a sealed compartment within the first outer housing, defined by the first and second membranes and being at least partially filled with a liquid, which prevents gas flow through the first outer housing from the first end to the second end; a separator attached to an inner perimeter of the second outer housing, which partitions the second outer housing into a first chamber and a second chamber, and defines the volume of gas stored in the first and second chambers.

In select aspects, the separator is a variable-position separator adapted to allow repositioning of the separator along an axis of the second chamber, such that repositioning of the separator adjusts the volume of gas stored in both chambers simultaneously.

In select aspects, at least one of the first and second membranes is a variable-position membrane configured to allow repositioning of the attachment point along a longitudinal axis of the first outer housing.

In select aspects, the first and second membranes are flexible and adapted to allow displacement of the liquid-filled compartment along a longitudinal axis of the first outer housing.

In select aspects, the first and second outer housings are adapted to function as a gas spring in response to displacement of the liquid-filled compartment along a longitudinal axis of the first outer housing, the gas spring being adapted to control a frequency and a level of vibration damping provided by the damper.

In select aspects, at least one of the conduits connecting the housings is adapted to allow adjustment of at least one of a length or a width of the conduit.

In a fifth exemplary aspect, a TLDM according to the present disclosure comprises an outer housing having two ends, each end being sealed and forming a gas-filled chamber within the outer housing; a first separator attached to an inner perimeter of the first end chamber, the first separator defining first and second partitions within the first end chamber and having an opening which allows gas to flow between the first and second partitions; a second separator attached to an inner perimeter of the second end chamber, the second separator defining first and second partitions within the second end chamber and having an opening which allows gas to flow between the first and second partitions; first and second membranes, each attached to the inside of the outer housing; and a sealed compartment within the outer housing, defined by the first and second membranes and being at least partially filled with a liquid, which prevents gas flow through the first outer housing from the first end to the second end.

In select aspects, at least one of the separators is a variable-position separator adapted to allow repositioning of the separator within its respective chamber and adjustment of the volume of gas stored in the partitions of the respective chamber.

In select aspects, at least one of the first and second membranes is a variable-position membrane configured to allow repositioning of the attachment point along a longitudinal axis of the outer housing.

In select aspects, the first and second membranes are flexible and adapted to allow displacement of the liquid-filled compartment along a longitudinal axis of the outer housing.

In select aspects, the first and second partitions of each chamber are adapted to function as a gas spring in response to displacement of the liquid-filled compartment along a longitudinal axis of the outer housing, each gas spring being adapted to control a frequency and a level of vibration damping provided by the damper.

In select aspects, the opening of at least one of the separators is adapted to allow adjustment of at least one of a length or a width of the opening.

In a sixth exemplary aspect, a TLDM according to the present disclosure comprises a first outer housing having two ends, the first end being open to the atmosphere and the second end being connected by a conduit to a gas-filled second outer housing, the conduit being adapted to allow gas flow between the second end and the second outer housing; a membrane, attached to the inside of the first outer housing, which prevents gas flow through the first outer housing from the first end to the second end; and a liquid column contained within the first outer housing, defined by the membrane and extending through the first outer housing towards the first end.

In select aspects, at least a portion of the first end of the first outer housing extends along a substantially vertical axis to form a vertical portion and the liquid column terminates within the vertical portion.

In select aspects, the membrane is a variable-position membrane configured to allow repositioning of the attachment point along a longitudinal axis of the first outer housing.

In select aspects, the membrane is flexible and adapted to allow displacement of the liquid column along a longitudinal axis of the first outer housing.

In select aspects, the first and second housings are adapted to function as a gas spring in response to displacement of the liquid column along a longitudinal axis of the first outer housing, the gas spring being adapted to control a frequency and a level of vibration damping provided by the damper.

In further aspects, vibration damping systems are disclosed, such systems comprising one or more TLDMs according to any aspect of the present disclosure attached to a structure (e.g., a tall building in need of damping), wherein at least one of the one or more TLDMs is configured to generate a force that reduces vibration of the structure.

In still further aspects, methods of reducing vibration of a structure are disclosed, such methods comprising attaching at least one TLDM according to any aspect of the present disclosure to a structure in need of damping, and reducing the vibration of the structure based upon a force generated by the at least one TLDM.

This simplified summary of exemplary aspects of the disclosure serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

DETAILED DESCRIPTION OF EXEMPLARY ASPECTS

Exemplary aspects of the disclosure are described herein in the context of a TLDM, various aspects of which being suitable to reduce vibrations when incorporated into tall buildings or structures such as skyscrapers and towers. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying, drawings. The same reference indicators will be used to the extent possible throughout the drawings and the following description to refer to the same or like items.

Figure 1A:
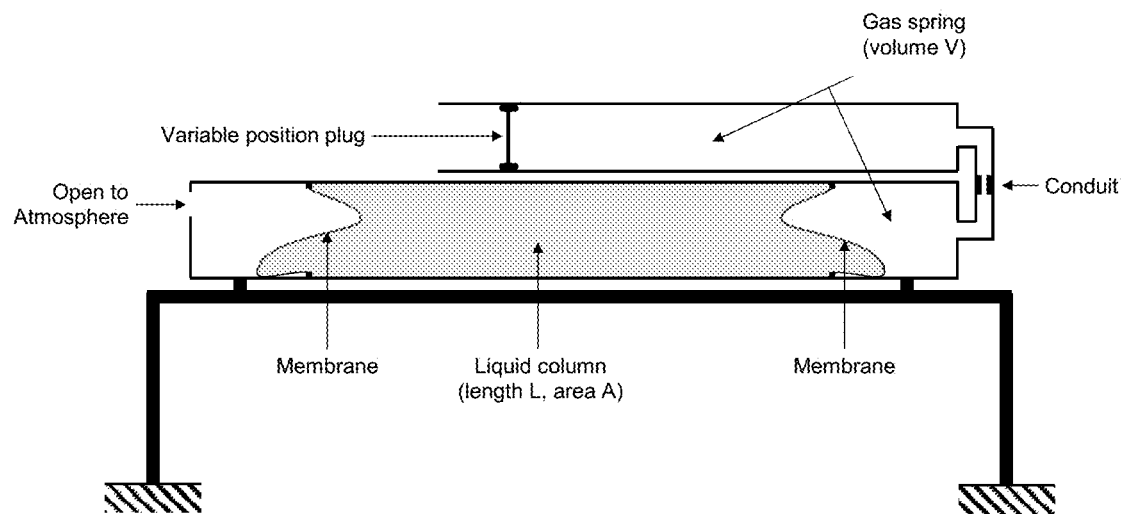
FIG. 1A is a cross-sectional view of a TLDM according to a first exemplary aspect of the present disclosure.

FIG. 1A is a schematic view of a TLDM according to a first exemplary aspect of the disclosure. The TLDM according to this aspect comprises an elongated first outer housing having a first end and a second end. The first end is open to the atmosphere and the second end is connected by a conduit to a gas-filled second outer housing, the conduit being adapted to allow gas flow between the second end and the second outer housing, resulting in a gas spring with a volume, "V." The first outer housing further includes first and second membranes, each attached to the inside of the first outer housing; and a sealed compartment within the first outer housing, defined by the first and second membranes and being at least partially filled with a liquid (e.g., a "liquid column" having length, "L" and area, "A"). This sealed compartment prevents gas flow through the first outer housing from the first end to the second end. As shown by FIG. 1A, the second outer housing may include a variable-position plug attached to an inside perimeter of the second outer housing, the plug being positioned to allow adjustment of the volume of gas stored in the second outer housing.

In this exemplary aspect, the first outer housing and the second outer housing are connected by a conduit. However, in alternative aspects, other structures which allow gas to flow between these housings may be used, based upon the needs of a given implementation and the intended parameters for the gas spring formed by the connected housings (e.g., one or more channels, holes, pipes, or other orifices between the housings). Moreover, the first and second housings may be formed as interconnected compartments or chambers within a single housing, as illustrated by other exemplary aspects described herein. In these aspects, the conduit may instead be replaced, for example, by a separator element having one or more orifices in it which allow gas to flow between the separated compartments or chambers. In some aspects, the aperture and/or length of the conduit (or equivalent element) may be adjustable, allowing a user or a device to tune the gas spring parameters as needed in response to various vibration conditions. It is understood that these modifications may also be applied to the other exemplary aspects described herein. For example, the exemplary aspects illustrated by FIGS. 3 and 4 may be modified to incorporate a separator element as shown in FIG. 2 in place of one or both of the conduits connecting the housings. Similar modifications are possible to exemplary aspects that are shown with separator elements, e.g., the exemplary aspect shown as FIG. 2 may be modified to replace the separator element with a conduit.

As indicated above, the exemplary aspect of FIG. 1 also illustrates the incorporation of a variable-position plug attached to the inside of the second housing. The gas spring may be tuned by selecting a second housing having a given volume and omitting this element. However, a variable-position plug provides convenience by allowing a user or device to adjust the volume of gas stored in the second outer housing as needed in response to various vibration conditions. It is understood that any of the membranes, plugs and separators described herein may be configured as a variable-position element, allowing reattachment of the element to different positions within the associated housing. In some aspects, the variable-position element will be configured to allow repositioning along a longitudinal axis of the housing in which it is contained.

Figure 1B:
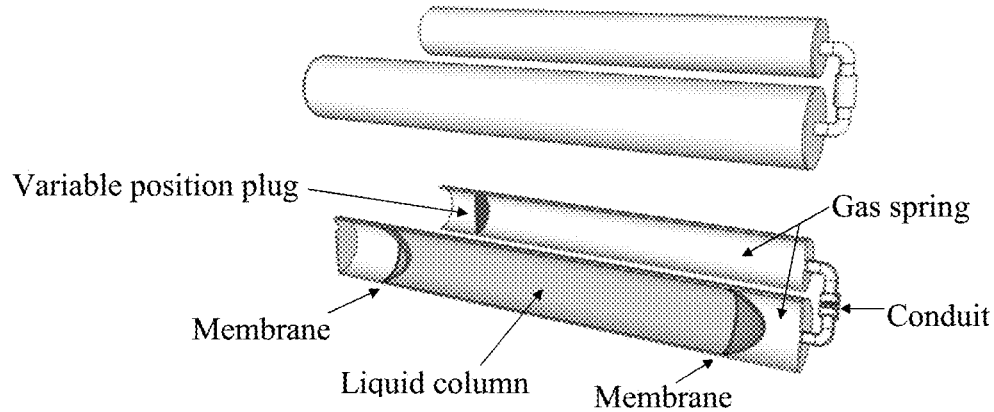
FIG. 1B is a perspective view of a TLDM according to the aspect shown in FIG. 1A.

In this exemplary aspect, the outer housing is shown to contain a liquid and a single gas spring (i.e., the gas-filled compartment formed from the connection between the second end of the first outer housing and the second outer housing). The liquid is separated from the gas spring by a flexible membrane which allows the liquid column to be partially displaced along a longitudinal axis within the outer housing in response to a longitudinal force. Displacement towards the gas spring compresses the gas stored in the gas-filled chamber, resulting in the generation of force in the opposite direction. The stiffness and the amount of damping can be controlled ("tuned") by adjusting the parameters of the gas spring (e.g., by adjusting the position of at least one of the membranes or the variable position plug or by changing the size of the orifice separating the chambers of the gas spring). The use of a membrane to separate the liquid from the gas spring provides substantial benefits compared to gravity-based TLCDs known in the prior art. The frequency of a gravity-based TLCD is set by the length of the liquid column and energy is dissipated by forcing the liquid to pass through gates when oscillating. Once it is built, a gravity-based TLCD can only be tuned to a narrow range of frequencies by adjusting the liquid level in the vertical segments of the tank. Improved TLCDs featuring a gas spring element have been developed, as noted above. However, such designs fail to provide a solution capable of being used to dampen slender buildings or buildings with narrow or small floorplans, whereby the frequency (f) needs to be low due to the height of the building but the length (L) is limited by the width and/or depth of the building. In contrast, the exemplary aspect illustrated by FIG. 1A uses a flexible membrane instead of gravity to separate the liquid and gas of a TLDM equipped with an adjustable gas spring. This eliminates the contribution of gravity to the stiffness of the damper thereby making it possible to tune the damper to low frequencies outside the range of traditional gravity-based TLCDs and allowing it to be used on slender or narrow buildings. For clarity, FIG. 1B provides a schematic view of this same exemplary aspect. As illustrated by this schematic, TLDMs according to the present disclosure may also omit the vertical ends required by TLCDs, resulting in a less obtrusive design which allows for more placement options (e.g., between floors).

The flexible membrane used in TLDMs according to the present disclosure may comprise a single material, a composite comprising multiple materials, or be structured as a laminate comprising two or more layers wherein each layer comprises a single material or a composite. The material or materials selected for a flexible membrane featured in any given aspect will vary based upon the needs of the implementation. In some aspects, the material may be waterproof or designed to repel the particular liquid contained in the membrane-bound compartment. The membrane may also comprise an abrasion-resistant material. In some aspects, the material is stretchable (e.g., an elastic polymer). In other aspects, the material may be a non-stretchable or substantially non-stretchable material. Non-stretchable materials may be particularly well-suited in implementations where the membrane is structured to allow folding and unfolding, rather than stretching, as the liquid is displaced. In select aspects, the membrane comprises a laminate having at least two layers (e.g., a waterproof, liquid-facing layer and a gas-facing layer that provides structural support). For example, a membrane may comprise a waterproof layer (e.g., Nylon 66 with a deposited neoprene coating) laminated to a matrix material (e.g., aramid). In some aspects, the liquid contained in the membrane may contain chemicals or salts (e.g., to prevent freezing, bacterial growth, and/or to increase mass). As a result, some aspects may benefit from a membrane formed from a material resistant to any such chemicals or salts.

The membrane, or plurality of membranes, included in the TLDM may be attached to the inside of the TLDM using any method or structure suitable for a given implementation. In some aspects, a membrane may be attached using a clamping system (e.g., a ring installed inside the outer housing may be configured to expand, locking a membrane in place by squeezing the membrane between the ring and the outer housing). A membrane may also be attached more permanently using chemical bonding. Variable-position implementations may utilize a clamping system or other mechanical means that allows for movement of the membrane attachment point. In some aspects, the outer housing may be manufactured as a series of modular segments with one or more slots adapted to allow for insertion of a membrane. Such designs allow easy removal of a segment so that a membrane can be serviced or replaced. Inflatable temporary barriers may also be incorporated into a modular system to facilitate membrane maintenance without the need to fully drain the TLDM. An inflatable temporary barrier may comprise, e.g., a balloon that could be inserted into the outer housing of a TLDM and inflated.

TLDMs according to this or any other exemplary aspect disclosed herein may be modified to include additional features suited to specific implementations. For example, the opening or orifice between any pair of compartments (e.g., between the first and second outer housing) may be adjustable along any dimension. For example, a mechanism may be provided that increases or decreases the aperture of the orifice. This mechanism may be designed to allow for tuning during servicing or in some aspects may allow for real-time adjustment. For example, the adjustment mechanism may be configured to communicate with one or more sensors and/or a computer that controls the dimensions of a given opening or orifice in response to current wind conditions. In still further exemplary aspects, TLDMs according to the disclosure may include ballasts (e.g., airtight containers) which may be inserted into or removed from an outer housing of a TLDM to control the volume of the housing, providing an additional means to tune the TLDM.

Figure 2A:
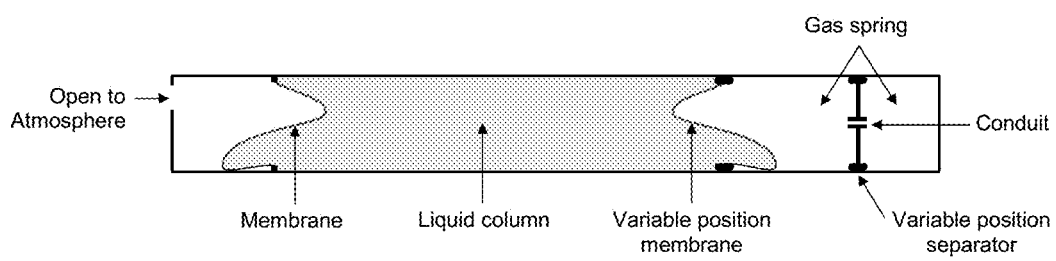
FIG. 2A is a cross-sectional view of a TLDM according to a second exemplary aspect of the present disclosure.
Figure 2B:
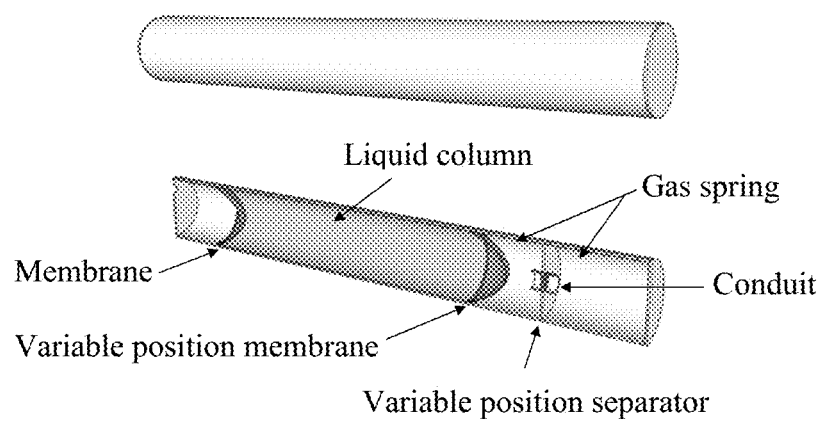
FIG. 2B is a perspective view of a TLDM according to the aspect shown in FIG. 2A.

FIG. 2A is a schematic view of a TLDM according to an alternative exemplary aspect of the disclosure. This implementation illustrates an in-line design which differs from that of FIG. 1A in that the gas spring lacks a variable-position plug. However, the parameters of the gas spring remain adjustable by way of the variable-position membrane and variable-position separator. For clarity, FIG. 2B provides a schematic view of this same exemplary aspect.

Figure 3:
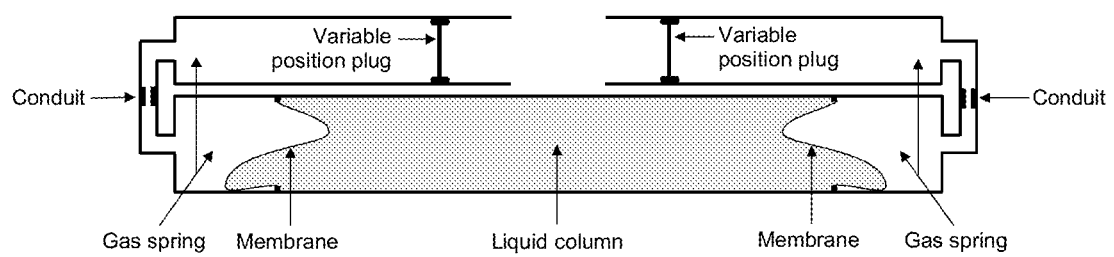
FIG. 3 is a cross-sectional view of a TLDM according to a third exemplary aspect of the present disclosure.

FIG. 3 is a schematic view of a TLDM according to an alternative exemplary aspect of the disclosure. As shown by this figure, the general design of FIG. 1A may be modified to incorporate a second gas spring. In this aspect, the first end of the elongated housing left open to atmosphere in FIG. 1A is instead replaced by a second gas spring that mirrors the configuration of the first gas spring. Note that each gas spring is independently tunable using the variable-position plug present in each of the respective gas springs. For some implementations, a dual gas spring system may be preferable as it can be tuned to provide damping at lower frequencies than single gas spring systems by depressurization of the gas springs.

Figure 4:
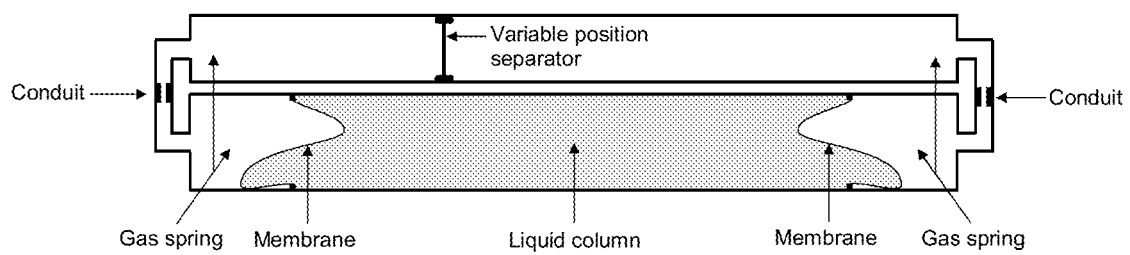
FIG. 4 is a cross-sectional view of a TLDM according to a fourth exemplary aspect of the present disclosure.

FIG. 4 is a schematic view of a TLDM according to an alternative exemplary aspect of the disclosure. This particular implementation is notable for illustrating a configuration wherein the elongated outer housing is fully sealed (i.e., neither side is open to atmosphere). As a result, the liquid column serves to bifurcate the outer housing into two gas spring compartments, which in this exemplary aspect, are separated by a single variable-position separator that simultaneously controls the volume of both gas springs. As a result, adjusting the position of the separator in either direction simultaneously has a net effect on the frequency of the damper.

Figure 5:
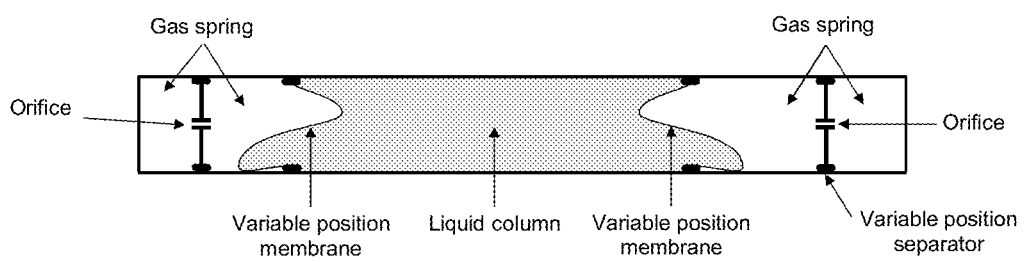
FIG. 5 is a cross-sectional view of a TLDM according to a fifth exemplary aspect of the present disclosure.

FIG. 5 is a schematic view of a TLDM according to an alternative exemplary aspect of the disclosure. This aspect is substantially similar to the aspect illustrated by FIG. 2A, but in a sealed configuration (i.e., the first end is no longer open to the atmosphere). Furthermore, this figure illustrates that the TLDM may be tuned by adjusting the position of one or both membranes as well as the variable-position separator included in each of the two gas springs featured in this implementation.

Figure 6A:
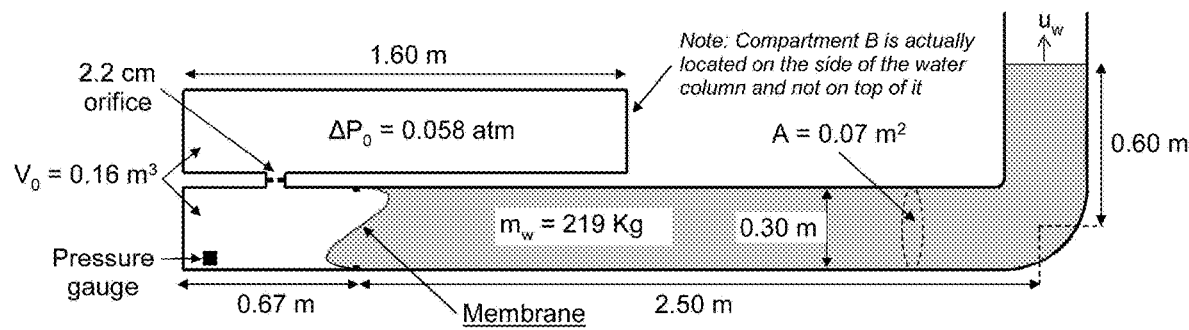
FIG. 6A is a cross-sectional view of a TLDM according to a sixth exemplary aspect of the present disclosure. Note that the smaller compartment labeled as "Compartment B" in this figure was located to the side of the water column during the experiments described below. Compartment B is shown above the primary compartment in this figure merely to simplify the illustration.

FIG. 6A is a schematic view of a TLDM according to an alternative exemplary aspect of the disclosure. This aspect is similar to the one shown in FIG. 2A in that the outer housing contains a single gas spring at a first end and an opening to the atmosphere at the second end. However, these aspects are structurally distinguishable based upon the fact that a single membrane is used instead of the dual membrane configuration shown in FIG. 2A and other exemplary aspects. In this instance, the liquid column extends through the outer housing, forming a vertical column at the second end, which is curved upward and open to the atmosphere. This aspect further illustrates that the gas spring based embodiments of the present disclosure can incorporate aspects of traditional gravity-based TLCDs to create a hybrid system. Note that in this exemplary aspect, the liquid column extends substantially through the full length of the outer housing; however, in other aspects, the liquid column may extend only partially through the outer housing, or at least until a point wherein the outer housing is oriented along a vertical axis. The hybrid system shown in FIG. 6A was tested to demonstrate the low stiffness and damping of the membrane interface, as described below in Example 3.

In further aspects of the present disclosure, vibration damping systems based upon the TLDMs disclosed herein are provided. One or more of the disclosed TLDMs may be attached to a structure in need of vibration damping. The TLDMs may be arranged in parallel (e.g., to counteract vibration along the same or a substantially similar axis). Alternatively, in some implementations the TLDMs may be arranged perpendicular to each other or in an irregular placement configuration. One or more of the TLDMs may be configured to activate or adjust the amount of damping in response to user input or an electronic signal. For example, a TLDM may be controlled by a computer that activates and/or adjusts the level of damping in order to compensate for a current level of wind-induced vibration detected by one or more sensors. For example, one or more sensors placed on a building or other structure may be used to detect wind speed and/or direction, and this data may be transmitted to a computer configured to activate and/or control one or more TLDMs used to dampen the vibration of the building or other structure. In some aspects, repositioning of variable-position elements (e.g., plugs, separators, membranes) featured in a given TLDM may be subject to similar control and adjustment by an automated system. Still further aspects may include, alone or in addition to any of the preceding modifications, computer-controlled adjustment of the dimensions of any opening or orifice (e.g., the opening between the first and second housings of a TLDM according to exemplary aspects disclosed herein).

In still further aspects, methods of reducing vibration in a structure are disclosed. These methods comprise attaching a TLDM according to any of the aspects disclosed herein to a structure in need of vibration damping, and reducing the vibration of the structure based upon a force generated by the TLDM. The structure may be any object that requires vibration damping (e.g., a building, skyscraper, monument, or any other form of construction).

EXAMPLES

Example 1

Derivation of the Gas Spring Model

Figure 7A:
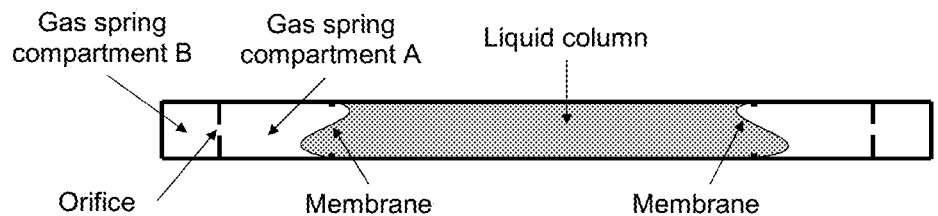
FIG. 7A is a schematic showing an exemplary aspect of the TLDM which includes two gas springs.

The stiffness and damping of the TLDMs disclosed herein are controlled by gas springs. As described above and illustrated by the provided figures, a gas spring may be formed by an enclosed volume of gas separated from a liquid column by a membrane and split into two compartments with an opening or orifice between them. A mathematical model for this type of gas spring is derived in the following passages, based upon the exemplary aspect illustrated as FIG. 7A. For the purposes of this analysis, the gas in the spring is assumed to be ideal and will undergo isentropic transformations when the spring expands and contracts. Under these assumptions, the volume V and pressure P of any given mass of gas in the spring follow Equation 1 below, where $\gamma$ is the heat capacity ratio of the gas:

$$PV^\gamma = \text{constant} \tag{1}$$

Figure 7B:
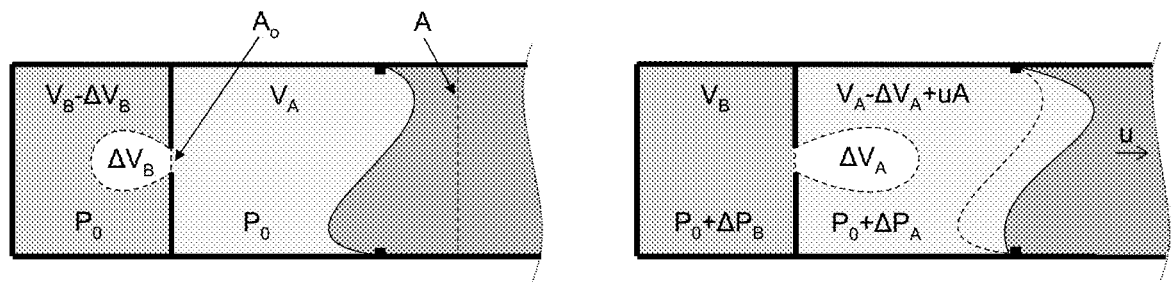
FIG. 7B is a schematic showing a detailed view of the left gas spring shown in FIG. 7A at rest (left) and expanded (right). This schematic was used to derive equations that apply to the gas springs of all of the damper configurations described above.

A model of the spring is shown in FIG. 7B. $V_A$ and $V_B$ are the volumes of the two compartments at rest and $P_0$ is the uniform pressure at rest. A is the area of the liquid column and $A_O$ the area of the opening between the gas compartments. When the liquid column experiences a displacement u, the pressures in the gas compartments have changed by $\Delta P_A$ and $\Delta P_B$, and a volume of gas $\Delta V_B$ has flowed from compartment B into compartment A, where its volume has become $\Delta V_A$. The representation provided as FIG. 7B separates the gas into 3 masses that experience different changes in volume and pressure and Equation 1 set forth above is applicable to each mass:

Gas that flowed from compartment B into compartment A:

$$\rightarrow P_0 \Delta V_B^\gamma = (P_0 + \Delta P_A) \Delta V_A^\gamma \tag{1}$$

$$\rightarrow \Delta V_A = \Delta V_B \left(\frac{P_0}{P_0 + \Delta P_A}\right)^{1/\gamma} \tag{2}$$

Gas that remained in compartment A:

$$\rightarrow P_0 V_A^\gamma = (P_0 + \Delta P_A)(V_A - \Delta V_A + uA)^\gamma \tag{1}$$

$$\text{with } P_0 V_A^\gamma = (P_0 + \Delta P_A)\left(V_A - \Delta V_B\left(\frac{P_0}{P_0 + \Delta P_A}\right)^{1/\gamma} + uA\right)^\gamma \tag{2}$$

$$\rightarrow \Delta P_A = P_0 \left(\left(1 + \frac{\Delta V_B - uA}{V_A + uA}\right)^\gamma - 1\right) \tag{3}$$

Gas that remained in compartment B:

$$\rightarrow P_0 (V_B - \Delta V_B)^\gamma = (P_0 + \Delta P_B) V_B^\gamma \tag{1}$$

$$\rightarrow \Delta P_B = P_0 \left(\left(1 - \frac{\Delta V_B}{V_B}\right)^{-\gamma} - 1\right) \tag{4}$$

The pressure changes are linearized, assuming that the displacement u of the liquid column is sufficiently small:

$$uA \ll V_A \text{ in (3)} \rightarrow \Delta P_A = P_0\left(\left(1 + \frac{\Delta V_B - uA}{V_A}\right)^\gamma - 1\right) \tag{5}$$

Taylor series with $\Delta V_B - uA \ll V_A$ (6)

$$\rightarrow \Delta P_A = \frac{\gamma P_0}{V_A}(\Delta V_B - uA)$$

Taylor series in (4) with $\Delta V_B \ll V_B \rightarrow \Delta P_B = \frac{\gamma P_0}{V_B}\Delta V_B \tag{7}$$

A displacement v is defined as a measure of the volume of gas exchanged between the compartments:

$$v = \frac{\Delta V_B}{A} \text{ in (6)} \rightarrow \Delta P_A = \frac{\gamma P_0 A}{V_A}(v - u)$$

$$\text{in (7)} \rightarrow \Delta P_B = \frac{\gamma P_0 A}{V_B} v$$

The following forces and stiffnesses are defined:

$$F_A = -\Delta P_A A = k_A(u - v) \text{ with } k_A = \frac{\gamma P_0 A^2}{V_A} \tag{8}$$

$$F_B = -\Delta P_B A = k_B v \text{ with } k_B = \frac{\gamma P_0 A^2}{V_B} \tag{9}$$

$$F_C = F_A - F_B = (\Delta P_B - \Delta P_A)A \tag{10}$$

The pressure difference $\Delta P_B - \Delta P_A$ controls flow rate $\Delta \dot{V}_B$ between the compartments, and therefore the velocity $\dot{v}$. The flow rate depends on the characteristics of the opening. If the opening is an orifice through a thin wall, the flow rate follows Equation 11 below where $A_o$ is the area of the orifice, $\rho_g$ is the mass density of the gas, and $\lambda$ is a dimensionless parameter for the shape of the orifice:

$$\Delta \dot{V}_B = \lambda A_o \sqrt{\frac{2}{\rho_g}(\Delta P_B - \Delta P_A)} \quad (11)$$

$$\text{in (10) with } v = \frac{\Delta V_B}{A} \rightarrow F_C = bv^2 \text{ with } b = \frac{\rho A^3}{2\lambda^2 A_o^2} \quad (12)$$

Figure 7C:
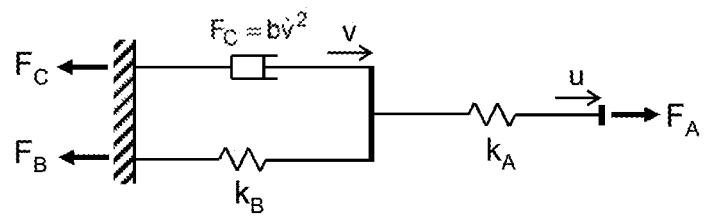
FIG. 7C is a model illustrating the forces applied to the representative gas spring, as derived in Experiment 1.

With Equations 8, 9 and 12 set forth above, the gas spring is modeled as a combination of two linear springs and a nonlinear damping element, as shown by FIG. 7C.

The gas springs of the disclosed TLDMs, in many aspects, are designed to have low damping, and in this case, the frequency of the damper is set by the static stiffnesses of its springs. With $V_0$ being the total volume of the spring at rest, the static stiffness of the spring is:

$$k_s = \frac{k_A k_B}{k_A + k_B} \quad (13)$$

$$\text{with (8), (9) and } V_0 = V_A + V_B \rightarrow k_s = \frac{\gamma P_0 A^2}{V_0}$$

Using the equations provided above, gas spring parameters for the exemplary aspects and various other TLDM implementations disclosed herein may be derived, allowing devices to be constructed which may be adjusted or "tuned" as necessary to compensate for various vibration parameters.

Example 2

Testing the TLDM

Figure 8A:
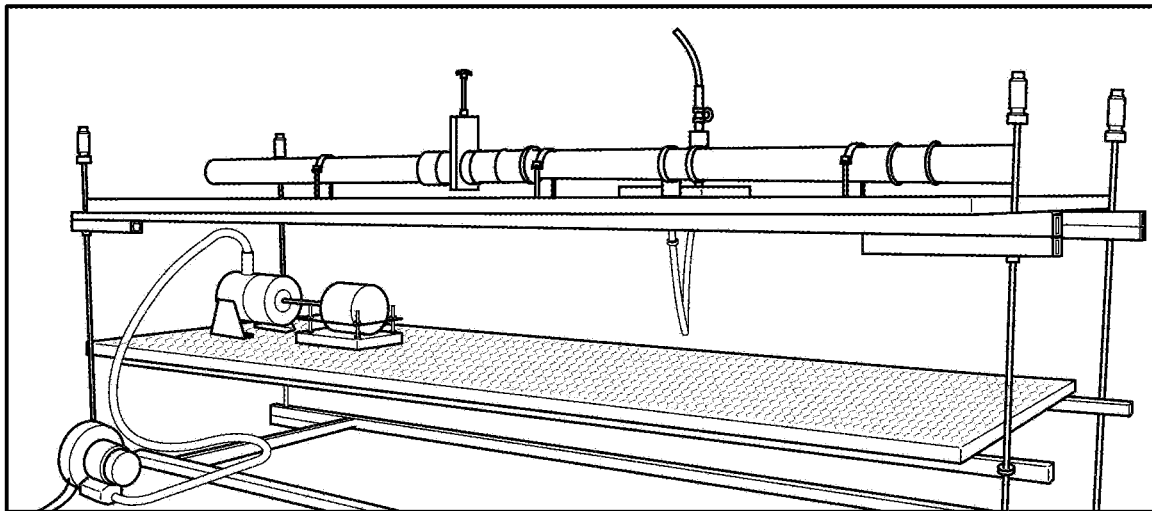
FIG. 8A is a photograph of the TLDM tested in Experiment 2.
Figure 8B:
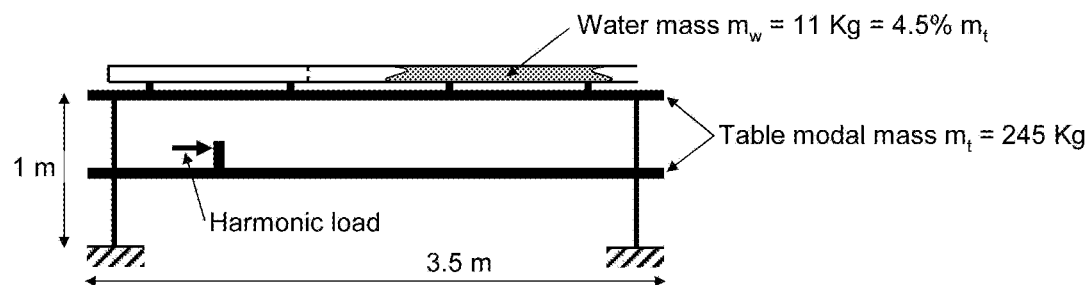
FIG. 8B is a schematic showing the test setup tested in Experiment 2.
Figure 8C:
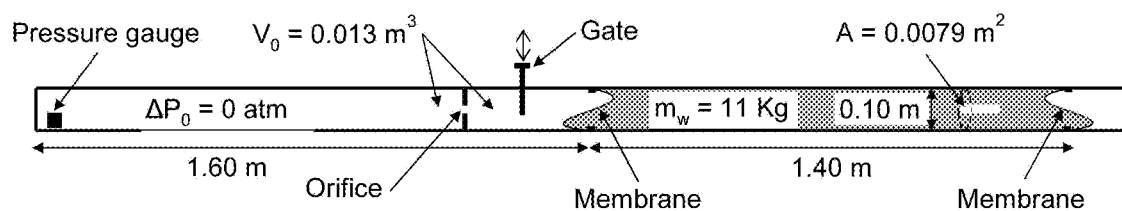
FIG. 8C is a schematic showing the damper model properties of the test setup examined in Experiment 2.

As shown in FIG. 8A, a scale model of a TLDM according to an exemplary aspect of the present disclosure was installed on a 2-level table that represents an underdamped structure. The parameters of this experimental model are summarized in FIG. 8B and FIG. 8C.

Without the damper, the first dynamic mode of the table has a period $T_t$=0.81 s, a damping ratio $\xi_t$=1.7% and a modal mass $\mu_t$=245 Kg. The damper model shown in FIG. 8A was designed to have the same period as the table:

Gas spring pressure: $P_0 = P_{atm} + \Delta P_0 = 1.013 \cdot 10^5$ Pa $$\rightarrow \text{Gas spring stiffness: } k_s = \frac{\gamma P_0 A^2}{V_0} = 670 \; N \cdot m^{-1} \quad (14)$$

$$\rightarrow \text{Damper period: } T = 2\pi \sqrt{\frac{m}{k_s}} = 0.81 \; s$$

The water mass is 4.5% of the modal mass of the table. A relatively large orifice was used in the gas spring to have low damping in the damper, although the precise value of the damping ratio is to be determined experimentally. The TLDM can be activated or deactivated by opening or closing a gate in the gas spring. When the gate is closed, the stiffness of the spring increases drastically and effectively prevents displacement of the water mass.

Figure 9A:
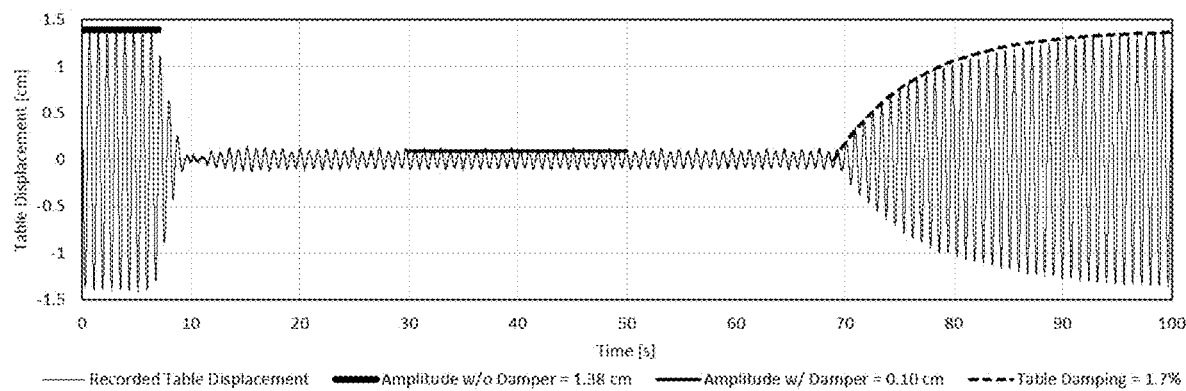
FIG. 9A is a graph showing table displacement recorded during Experiment 2.
Figure 9B:
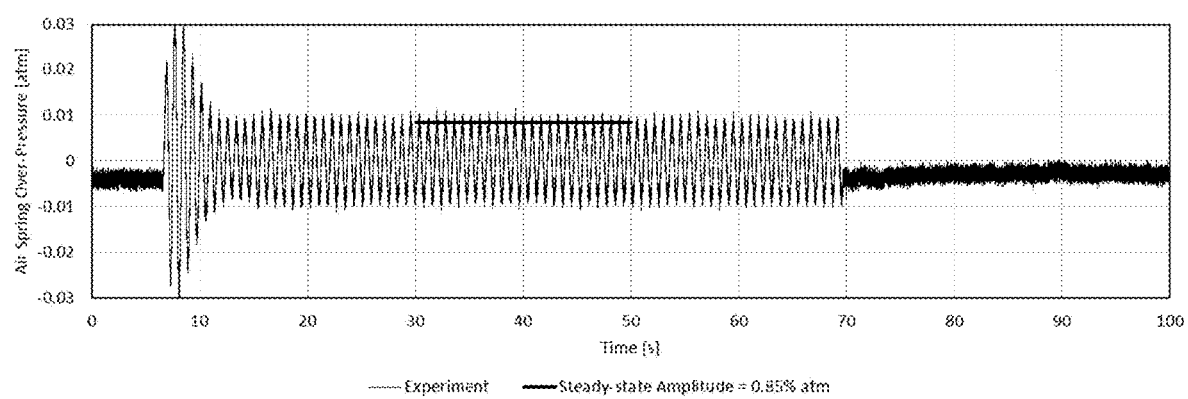
FIG. 9B is a graph showing gas spring over-pressure recorded during Experiment 2.

The test consists of activating and deactivating the damper under constant loading conditions. During the entire test, a shaker installed on the lower level of the table applied a periodic force of a constant magnitude. The shaking period was set to the resonant frequency of the table with the mass of the deactivated damper set at 0.83 s. The damper was deactivated at the start of the test, then activated for 1 minute, and then deactivated again. The displacement of the table and the over-pressure in the gas springs were recorded, as shown in FIGS. 9A and 9B.

The damper decreased the vibrations of the table by 93%, from 1.38 cm down to 0.10 cm. The overpressure in the gas spring varies with an amplitude $\Delta P$=0.85% atm when the TLDM is active and the corresponding displacement $u_w$ of the water column is obtained by applying Equation 1 to the entire gas spring:

$$(P_{atm} + \Delta P_0)V_0^\gamma = (P_{atm} + \Delta P)(V_0 + u_w A)^\gamma$$

$$\rightarrow u_w = \frac{V_0}{A}\left(\left(\frac{P_{atm} + \Delta P_0}{P_{atm} + \Delta P}\right)^{1/\gamma} - 1\right) = 1.01 \; cm$$

Figure 9C:
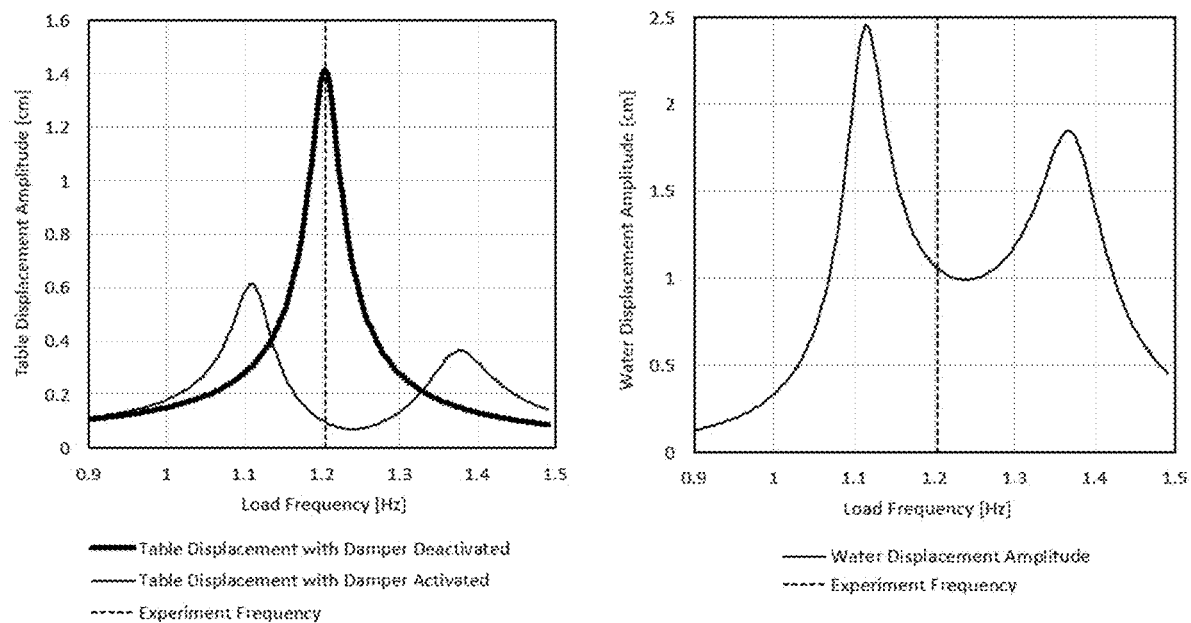
FIG. 9C is a pair of graphs showing theoretical displacement values for the table (left) and water (right) versus load frequency, which confirm the experimental results recorded during Experiment 2.

Considering the properties of the table and the mass and frequency of the TLDM, the 94% decrease in table response and the 1.01 cm amplitude of the water displacement are both consistent with a damping ratio of 3.5% in the TLDM. FIG. 9C shows the theoretical amplitudes of the table and water displacements under a load of the same magnitude as in the experiment but applied at a range of frequencies, with the TLDM assumed to have a damping ratio of 3.5%. This test demonstrated that TLDMs of the present disclosure may be constructed which function with low inherent damping.

Example 3

Testing a Further Exemplary Aspect of the TLDM

Figure 6B:
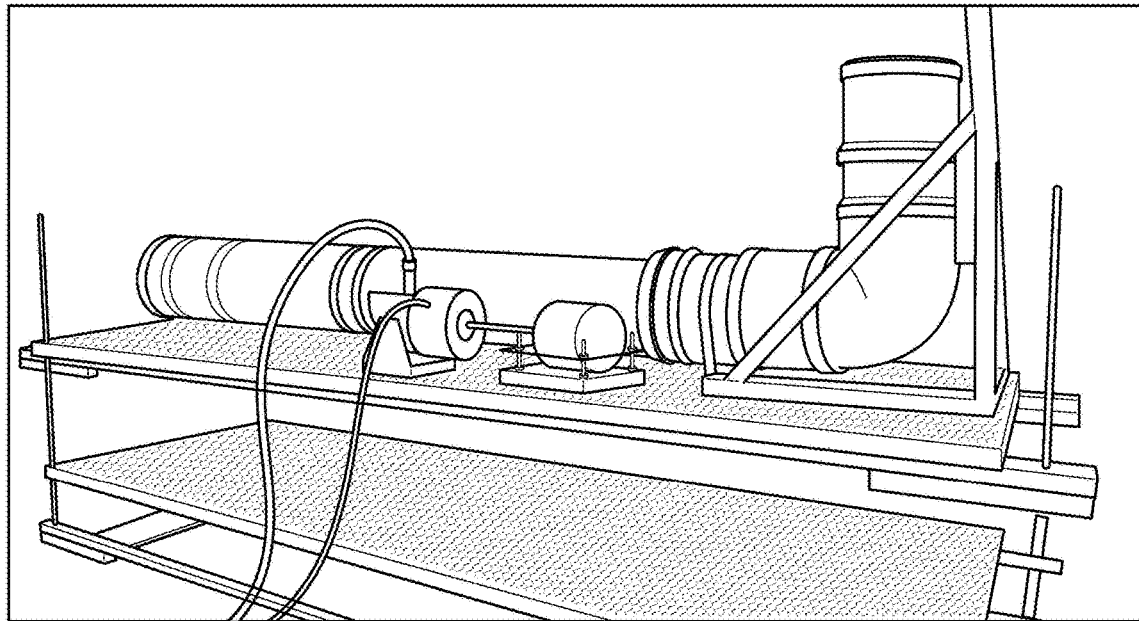
FIG. 6B is a photograph of the exemplary aspect shown in FIG. 6A.

The hybrid TLDM system shown in FIG. 6A was tested to demonstrate the low stiffness and damping of the membrane interface. A photograph of the experimental setup is provided by FIG. 6B. As shown by FIG. 6A, the test setup consisted of a water column with a gas spring at one end and open to the atmosphere at the other end. The pressure in the gas spring at rest is higher than atmospheric pressure by $\Delta P_0$ due to the water head at the open end. The stiffness of the gas spring is given by Equation 14, using $\gamma$=1.4 for air:

$$k_s = \frac{\gamma P_0 A^2}{V_0} = \frac{\gamma(P_{atm} + \Delta P_0)A^2}{V_0} = 4{,}673 \; N \cdot m^{-1}$$

Neglecting the stiffness of the membrane, the total stiffness k of the system is obtained by adding only the gravitational stiffness at the open end, with $\rho_w$ being the mass density of water and g being the gravitational acceleration:

$k = k_s + \rho_w g A = 5{,}366$ N·m$^{-1}$

The period T of the system is then:

$$T = 2\pi \sqrt{\frac{m}{k}} = 1.27 \; s$$

Figure 10A:
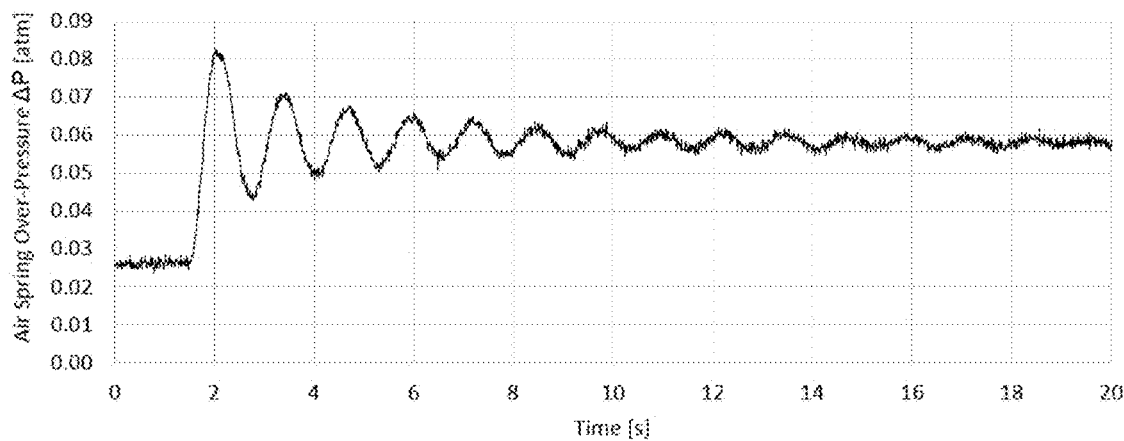
FIG. 10A is a graph showing gas spring over-pressure recorded during Experiment 3, which used a test setup as shown in FIGS. 6A and 6B.

The test consists of releasing the water column from a static displacement and monitoring the subsequent oscillations of the system. An initial displacement of 5 cm was imposed by inflating the gas spring and a cap was then installed at the top of the open end before letting the additional gas escape back from the spring. The water column was then let go by suddenly removing the cap from the open end and the over-pressure in the gas spring was recorded as show in FIG. 10A.

The displacement $u_w$ of the water column is obtained from the over-pressure $\Delta P$ by applying Equation 1 to the entire gas spring:

$$\rightarrow (P_{atm} + \Delta P_0)V_0^\gamma = (P_{atm} + \Delta P)(V_0 + u_w A)^\gamma \quad (1)$$

$$\rightarrow u_w = \frac{V_0}{A}\left(\left(\frac{P_{atm} + \Delta P_0}{P_{atm} + \Delta P}\right)^{1/\gamma} - 1\right)$$

Figure 10B:
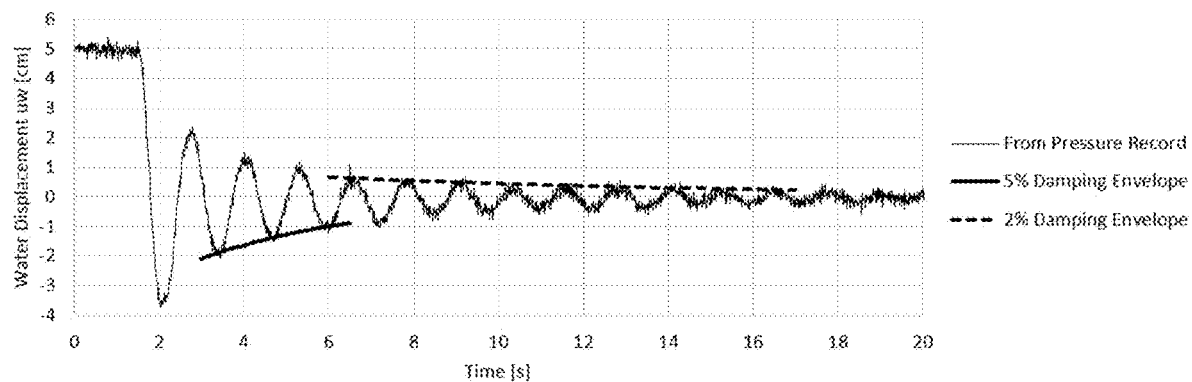
FIG. 10B is a graph showing water column displacement recorded during Experiment 3, which used a test setup as shown in FIGS. 6A and 6B.

The water column displacement is shown in FIG. 10B with two exponential decrement envelopes corresponding to different damping ratios. The decrease in damping with the amplitude of the oscillation is consistent with the behavior of an orifice (Equation 12). The test demonstrated that the membrane interface allows the water column to vibrate with low damping for a sustained period of time. In addition, the average period of the vibrations was measured at 1.28 s and therefore matched the theoretical value obtained by neglecting the stiffness of the membrane.

In the interest of clarity not all of the routine features of the aspects are disclosed herein. It is understood that in the development of an actual implementation of the present disclosure, numerous implementation-specific decisions must be made in order to achieve specific goals (e.g., TLDM systems may be configured and tuned based upon structure-specific parameters), and that these specific goals will vary for different implementations. It will be appreciated that such a efforts might be complex and time-consuming, but would nevertheless be a routine undertaking of engineering for those of ordinary skill in the art, having the benefit of the present disclosure.

Furthermore, it is understood that the phraseology or terminology used herein is for the purpose of description and not of restriction, such that the terminology or phraseology of the present disclosure is to be interpreted in light of the teachings and guidance presented herein, in combination with knowledge available to a person of ordinary skill in the relevant art(s) at the time of invention. Moreover, it is not intended for any term in the specification or claims to be ascribed an uncommon or special meaning unless explicitly set forth as such in the specification.

The various aspects disclosed herein encompass present and future known equivalents to the structural and functional elements referred to herein by way of illustration. Moreover, while various aspects and applications have been shown and described herein, it will be apparent to those skilled in the art having the benefit of this disclosure that many more modifications than those mentioned above are possible without departing from the inventive concepts disclosed herein. For example, one of ordinary skill in the art would readily appreciate that individual features from any of the exemplary aspects disclosed herein may be combined to generate additional aspects that are in accordance with the inventive concepts disclosed herein.

It is further understood that any combination of elements or steps described herein may be used alone or in combination with still further unrecited elements or steps. To that end, any reference to the transitional phrase "comprising" recited herein is expressly understood to also include support for alternative aspects directed to a closed set (i.e., "consisting of" only the recited elements) and for a semi-closed set (i.e., "consisting essentially of" the recited elements and any additional elements or steps that do not materially affect the basic and novel characteristics of the invention).

Although illustrative exemplary aspects have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

The invention claimed is:

1. A tuned liquid damper, comprising:
   a first outer housing having two ends, the first end being open to the atmosphere and the second end being connected by a conduit to a gas-filled second outer housing, the conduit being adapted to allow gas flow between the second end and the second outer housing;
   first and second elastic membranes positioned within the first outer housing, each elastic membrane being attached to an inside surface of the first outer housing; and
   a sealed compartment within the first outer housing, defined by the first and second elastic membranes and being at least partially filled with a liquid, which prevents gas flow through the first outer housing from the first end to the second end.

2. The tuned liquid damper of claim 1, wherein the second outer housing contains a variable-position plug attached to an inside perimeter of the second outer housing, the plug being positioned to allow adjustment of the volume of gas stored in the second outer housing.

3. The tuned liquid damper of claim 2, wherein the variable-position plug is configured to remain stationary during operation of the tuned liquid damper.

4. A vibration damping system, comprising a plurality of tuned liquid dampers, wherein each tuned liquid damper comprises the tuned liquid damper of claim 2; and wherein the variable-position plug of said each tuned liquid damper attached to the inside perimeter of each second outer housing is attached at a different position along a horizontal axis of the respective second outer housing.

5. The vibration damping system of claim 4, wherein said each tuned liquid damper is configured to dampen at a different frequency of vibration.

6. The tuned liquid damper of claim 1, wherein at least one of the first and second elastic membranes is a variable-position membrane configured to allow repositioning of the attachment point along a longitudinal axis of the first outer housing.

7. The tuned liquid damper of claim 1, wherein the first and second elastic membranes are flexible and adapted to allow displacement of the liquid-filled compartment along a longitudinal axis of the first outer housing.

8. The tuned liquid damper of claim 1, wherein the first and second outer housings are adapted to function as a gas spring in response to displacement of the liquid-filled compartment along a longitudinal axis of the first outer housing, the gas spring being adapted to control a frequency and a level of vibration damping provided by the damper.

9. The tuned liquid damper of claim 1, wherein the conduit is adapted to allow adjustment of at least one of a length or a width of the conduit.

10. The tuned liquid damper of claim 1, wherein the first and second elastic membranes are each configured to flex along the same axis.

11. The tuned liquid damper of claim 1, wherein the first and second elastic membranes are each attached only to the inside surface of the first outer housing.

12. The tuned liquid damper of claim 1, wherein the first and second elastic membranes are each configured to remain within the first outer housing during operation of the tuned liquid damper.

13. The tuned liquid damper of claim 1, wherein the sealed compartment occupies more than half of the volume of the first outer housing.

14. A vibration damping system, comprising:
a tuned liquid damper attached to a structure, the tuned liquid damper comprising:
a first outer housing having two ends, the first end being open to the atmosphere and the second end being connected by a conduit to a gas-filled second outer housing, the conduit being adapted to allow gas flow between the second end and the second outer housing;
first and second elastic membranes positioned within the first outer housing, each flexible membrane being attached to an inside surface of the first outer housing; and
a sealed compartment within the first outer housing, defined by the first and second elastic membranes and being at least partially filled with a liquid, which prevents gas flow through the first outer housing from the first end to the second end;
wherein the tuned liquid damper generates a force that reduces a vibration of the structure.

15. A method of reducing a vibration of a structure, comprising:
attaching at least one tuned liquid damper to a structure, wherein the at least one tuned liquid damper comprises:
a first outer housing having two ends, the first end being open to the atmosphere and the second end being connected by a conduit to a gas-filled second outer housing, the conduit being adapted to allow gas flow between the second end and the second outer housing;
first and second elastic membranes positioned within the first outer housing, each elastic membrane being attached to an inside surface of the first outer housing; and
a sealed compartment within the first outer housing, defined by the first and second membranes and being at least partially filled with a liquid, which prevents gas flow through the first outer housing from the first end to the second end;
reducing the vibration of the structure based upon a force generated by the at least one tuned liquid damper.

16. The vibration damping system of claim 14, wherein the second outer housing contains a variable-position plug attached to an inside perimeter of the second outer housing, the plug being positioned to allow adjustment of the volume of gas stored in the second outer housing.

17. The method of claim 15, wherein the second outer housing contains a variable-position plug attached to an inside perimeter of the second outer housing, the plug being positioned to allow adjustment of the volume of gas stored in the second outer housing.

* * * * *